(12) United States Patent
Pihlajamäki et al.

(10) Patent No.: US 9,137,384 B2
(45) Date of Patent: Sep. 15, 2015

(54) SYSTEM AND A METHOD FOR MANAGING A SUBSCRIPTION FOR A DATA COMMUNICATIONS NETWORK

(75) Inventors: Antti Pihlajamäki, Espoo (FI); Frans Tuomela, Helsinki (FI)

(73) Assignee: TeliaSonera AB, Stockholm (SE)

( * ) Notice: Subject to any disclaimer, the term of this patent is extended or adjusted under 35 U.S.C. 154(b) by 0 days.

(21) Appl. No.: 13/439,316

(22) Filed: Apr. 4, 2012

(65) Prior Publication Data

US 2012/0282892 A1 Nov. 8, 2012

(30) Foreign Application Priority Data

Apr. 4, 2011 (EP) ..................................... 11397505

(51) Int. Cl.
| | |
|---|---|
| H04M 11/00 | (2006.01) |
| H04M 15/00 | (2006.01) |
| H04L 12/14 | (2006.01) |
| H04L 12/66 | (2006.01) |
| H04W 4/24 | (2009.01) |
| H04W 8/00 | (2009.01) |
| H04W 64/00 | (2009.01) |
| H04W 92/18 | (2009.01) |

(52) U.S. Cl.
CPC ............... *H04M 15/00* (2013.01); *H04L 12/14* (2013.01); *H04L 12/66* (2013.01); *H04M 15/765* (2013.01); *H04M 15/77* (2013.01); *H04M 15/771* (2013.01); *H04M 15/773* (2013.01); *H04M 15/8022* (2013.01); *H04M 15/8033* (2013.01); *H04W 4/24* (2013.01); *H04W 8/005* (2013.01); *H04W 64/00* (2013.01); *H04W 92/18* (2013.01); *H04M 2215/724* (2013.01); *H04M 2215/7254* (2013.01); *H04M 2215/7259* (2013.01); *H04M 2215/7268* (2013.01); *H04M 2215/7421* (2013.01); *H04M 2215/7435* (2013.01)

(58) Field of Classification Search
CPC .......... H04W 4/24; H04W 4/26; H04M 15/00
USPC .................................................. 455/405, 406
See application file for complete search history.

(56) References Cited

U.S. PATENT DOCUMENTS

| | | | |
|---|---|---|---|
| 5,771,282 A | 6/1998 | Friedes | |
| 2002/0094801 A1* | 7/2002 | Atorf | ............................. 455/406 |
| 2003/0045269 A1 | 3/2003 | Himmel et al. | |
| 2004/0141472 A1 | 7/2004 | Haddad | |
| 2007/0026857 A1* | 2/2007 | Kotzin | ........................ 455/426.1 |

(Continued)

FOREIGN PATENT DOCUMENTS

| | | |
|---|---|---|
| EP | 1 215 929 | 6/2002 |
| EP | 1 768 323 | 3/2007 |

(Continued)

*Primary Examiner* — Omoniyi Obayanju
(74) *Attorney, Agent, or Firm* — Cozen O'Connor

(57) ABSTRACT

A system for managing a subscription for a data communications network comprises a main device having a data connection to the data communications network under a subscription, at least one other device capable of forming a data connection to the data communications network under said subscription, means for determining a proximity of the main device and the other device with respect to each others, and means for applying a combined subscription charging model for the data connection of the other device when the proximity is verified. The solution also concerns a method for managing a subscription a data communications network.

12 Claims, 2 Drawing Sheets

(56) References Cited

U.S. PATENT DOCUMENTS

| | | | |
|---|---|---|---|
| 2008/0080448 A1* | 4/2008 | Rottinghaus | 370/342 |
| 2008/0096579 A1* | 4/2008 | Gill | 455/456.1 |
| 2010/0189096 A1* | 7/2010 | Flynn et al. | 370/352 |
| 2012/0258740 A1* | 10/2012 | Mildh et al. | 455/456.4 |

FOREIGN PATENT DOCUMENTS

| | | |
|---|---|---|
| GB | 2 322 771 | 9/1998 |
| WO | WO 99/01998 | 1/1999 |
| WO | WO 01/95128 | 12/2001 |
| WO | WO 2007/120598 | 10/2007 |

* cited by examiner

SYSTEM AND A METHOD FOR MANAGING A SUBSCRIPTION FOR A DATA COMMUNICATIONS NETWORK

CROSS-REFERENCE TO RELATED APPLICATIONS

This application claims priority under 35 USC §119 to European Patent Application No. 11397505.6 filed on Apr. 4, 2011.

BACKGROUND OF THE INVENTION

1. Field of the Invention

The present invention concerns a system and a method for managing a subscription for a data communications network.

2. Description of the Related Art

The amount of electronic devices being possessed by a single user is increasing. It appears that users are keen on connecting internet (i.e. having a data access) more often and in more varying situations. Therefore, the need of owning various devices suitable for such situations is growing. Device manufacturers have been paid attention to this need, and have provided wide range of devices that can be used for accessing data and for electronic communication. However, what has not been thought about in the same extent is how to arrange these devices to operate over a common feature.

There are known solutions for sharing a common feature between several devices. For example, a publication WO 99/01998 discloses sharing a single subscription to a mobile radio telephone network within a user group, where each user has a mobile telephone (being predefined for the system). The user group has a system identity and each user has a member identity, which both are needed when the subscription is commonly used. The system comprises a service node that is configured to control incoming and outgoing connections to each user. Another example is disclosed in a publication WO 01/95128, where a group of users share a network infrastructure. In this publication, a plurality of clients existing close to each other are capable of sharing a common gateway that is a primary interface for connecting network outside the group premises. Yet another example is disclosed in a publication EP 1,768,323 where functionality of a device can be expanded with features of another device. This can be done with a share module existing in both devices. By means of the share module a first device without e.g. multimedia messaging service, can send multimedia messages by using the multimedia messaging service of another device.

All the previous examples are targeted to a situation where multiple users, each having a device, share a common feature (a subscription, a bandwidth, a functionality). What is also important in such a situation, is to share charges of the common feature between the multiple users, especially if sharing of a subscription or bandwidth is in question. WO 01/95128 discloses that the applied charging model comprises paying for the bandwidth in advance by each client. WO 99/01998 on the other hand discloses a single subscriber fee that is paid for the operator and that the service node is configured to compile charging information on each member of a user group by means of a member identity.

However, none of these publications disclose a solution for the needs of a single user having multiple devices, each being capable of using e.g. a mobile data network. Such a solution should be usable for the single user so that s/he would not need to pay for the data access as many times as s/he has the devices, but also the solution should be trustworthy from the operator's point of view so that no other person than the actual subscriber could use the data access—or if could, it would be charged differently.

SUMMARY OF THE INVENTION

The aim of the present solution is to provide a system and a method being targeted to such a need.

According to an example, the system for managing a subscription for a data communications network comprises a main device having a data connection to the data communications network under a subscription, at least one other device capable of forming a data connection to the data communications network under said subscription, means for determining a proximity of the main device and the other device with respect to each others, and means for applying a combined subscription charging model for the data connection of the other device when the proximity is verified.

According to an example, the method for managing a subscription for a data communications network wherein a main device is having a data connection to the data communications network under a subscription and wherein at least one other device is capable of forming a data connection to the data communications network under said subscription, the method comprises determining a proximity of the main device and said at least one other device with respect to each others, and applying a combined subscription charging model for the data connection of the other device when the proximity is verified.

According to another example, the means for determining the proximity is capable of analyzing whether the main device and said at least one other device are located in the same cell of the data communications network.

According to yet another example, the means for determining the proximity is capable of analyzing whether the main device and said at least one other device are located in the neighbouring cells of the data communications network.

According to yet another example, the means for determining the proximity is capable of receiving information on a short-range connection between the main device and said at least one other device to verify the proximity.

According to yet another example, the means for determining the proximity is capable of receiving location information of the main device and said at least one other device to verify the proximity According to yet another example the means for applying a combined subscription charging model are configured to apply an individual subscription charging model, if the proximity of the main device and said at least one other device is not verified, According to yet another example, said at least one other device is of different type than the main device.

According to yet another example, the data connection is a mobile data connection.

According to yet another example, the main device and said at least one other device are owned by a single user.

According to yet another example, the combined subscription charging model is a flat-rate charging model.

According to yet another example, the combined subscription charging model is based on data block pricing.

The combined subscription of the present solution allows a user to have multiple devices, each having a data access capability, but only one subscription to the data communications network for all the devices. From the user's point of view, this is advantageous, because the charge of the combined subscription can be made more tempting compared to the sum of individual subscriptions of each device. In addition, the present solution for the combined subscription is advantageous for the operator what comes to avoiding possible misuse. The charging model applied for the combined subscription has been designed so that it should not draw users to connect network under someone else's combined subscription.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the following, various embodiments of the invention will be described in more detail with reference to the appended drawings, in which.

DETAILED DESCRIPTION OF THE PREFERRED EMBODIMENTS

Nowadays increasingly more single users are having more than one electronic device being capable of connecting data communications network and utilizing data therein. For example, a user may have a smartphone, a personal computer and a tablet device. "Mobile data" is a term covering any electronic service but also an electronic source for the data that is reachable via mobile network. The present solution introduces a combined subscription for all the user's devices to access data communications network, such as a mobile data communications network. This combined subscription has its own charging model, which is more economical to the user than to have an individual subscription for each device.

A subscription relates to an agreement between a user and a network operators which allows the user to access the network. The subscription is related with a certain charging model which can be prepaid or postpaid; flat-rate pricing or data block pricing. In the following, terms "combined subscription" and "an individual subscription" are used. The combined subscription according to this solution corresponds to a subscription that can be used by more than one devices. The individual subscription corresponds to a subscription being used by one device in a time.

Figure 1:
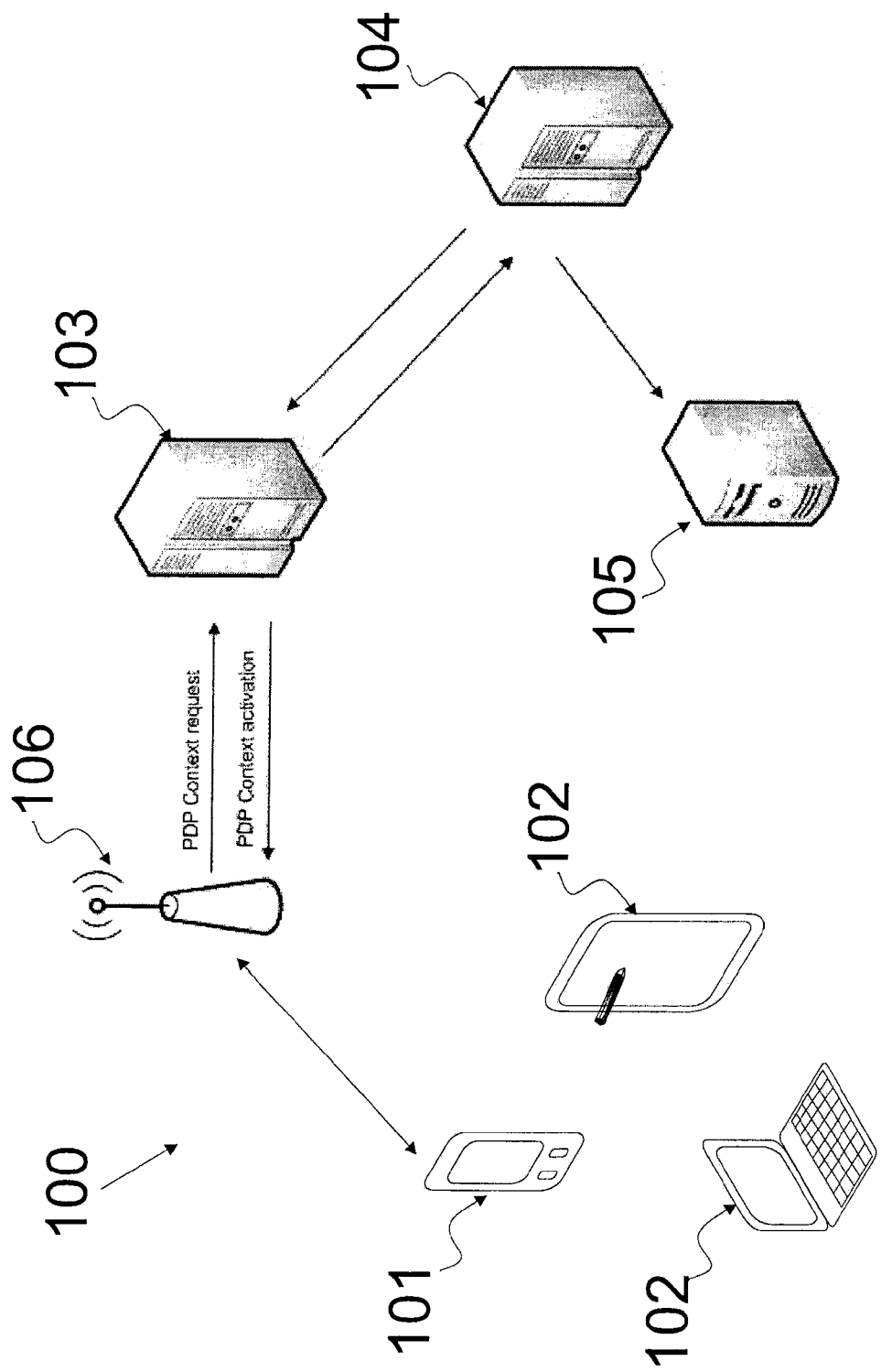
FIG. 1 illustrates an example of the system.

An example of the system is presented in FIG. 1. The system (100) comprises a smart phone (101) and at least one other device (102). It is appreciated that the first device (101) can be also some other device than a smart phone, e.g. a tablet device, a personal computer, a laptop computer, a palmtop computer, etc. The other device (102) can be a smart phone, a tablet device, a personal computer, a laptop computer, a palmtop computer, etc. In this example the smart phone (101) is selected as a main device, but it is appreciated that any other device can also act as a main device. The main device may always be connected to a data communications network by using a subscription to the data communications network.

FIG. 1 illustrates also other components of the data communications network of this example that are known as such and that can be varied depending on the situation and the network architecture. The system 100 for a mobile network comprises a GGSN/SGSN (Gateway GPRS Support Node/Serving GPRS Support Node) (103) that interworks between the mobile network and the internet, and activates PDP (Packet Data Protocol) context. Further, the system comprises a HLR/HSS (Home Location Register/Home Subscriber Service) (104) that knows the user's devices' locations. Yet, further the system comprises an access point (106) that is connected for forming the data access by setting up the PDP Context. The system also comprises a billing system (105).

At the time the other device (102) is opening the data access to the data communications network by using the combined subscription, the HLR/HSS (104) is checked whether the smartphone (101) and the other device (102) are within the close proximity to each other. This checking determines, whether the connection should be allowed, and how should it be charged. It is realized that in this example the HLR/HSS (104) acts as means for determining the proximity of the devices.

If the required proximity of the smartphone and the other device is verified, the HLR/HSS (104) informs that the access is allowed and advises the billing system (105) to use a combined subscription charging model. The billing system (105) then applies the combined subscription charging model for the data connection of the other device (102). If it is realized that the smartphone (101) and the other device (102) are not close enough to each other, then the HLR/HSS (104) would advice the billing system (105) to use another charging model (a.k.a an individual subscription charging model) that can be based on operators conventional charging for individual subscriptions. When the charging model is changed from the combined subscription charging model to the individual subscription charging model, a message of the change may be transmitted to the other device (102) e.g. by SMS or via the data access.

Figure 2:
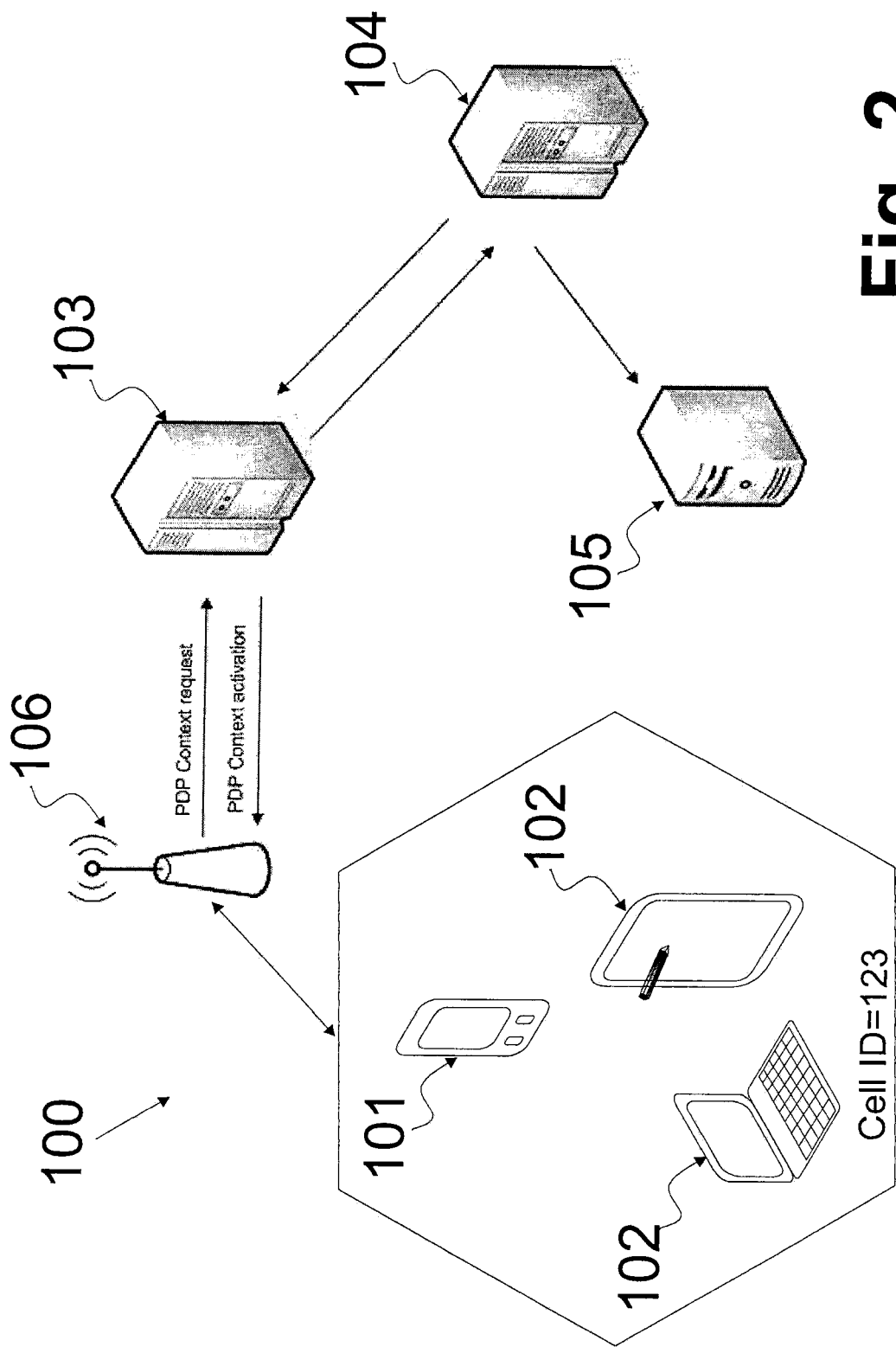
FIG. 2 illustrates the system according to an embodiment.

As said, the combined subscription charging model is applied, when the main device (101) and the other device (102) are close enough to each other. The operator is capable of determining which factors verify and define the closeness. FIG. 2 illustrates one example of how the proximity can be determined. In this embodiment the devices (101, 102) uses the same data communication technology (such as GSM), and therefore the proximity can be defined by determining the identities of the network cells (Cell ID) where the devices (101, 102) are situated. In such a situation, the proximity is verified when the cell identities are the same for both of the devices (101, 102) (as in FIG. 2) or when the cell identities of the devices are of the neighbouring cells. This means that the devices are close enough to each other and combined subscription charging model can be applied. However, in the case where the proximity cannot be verified (e.g. because of the different cell identities being located also far from each others), another charging model, such as the individual subscription charging model, is applied. This helps in preventing a misuse of a combined subscription by another user working with a subscribed user's device. In the example of FIG. 2, the devices (101, 102) are located in the same cell (Cell ID=123), and therefore the tablet device (102) can use the combined subscription.

As said, the example above is suitable in situations where the devices are configured to use the same data communications network. However, when the other device uses GSM and the other uses UMTS, the same example cannot be applied as straightforward as above, because the location area code and the cell identity of the networks are different for the devices even if the devices were in exactly the same place. Therefore, when the proximity is determined by means of cells, the operator can define the range of proximity and may give conditions for different situations. The operator can define the proximity according to e.g. MCC+MNC+LA (where MCC stands for Mobile Country Code; MNC stands for Mobile Network Code; LA for Location Area) or MCC+MNC+LA+ CI(s) (where CI stands for Cell Identity) and taking into account different data communications networks.

The proximity of the devices can also be determined by a suitable application residing at devices. Such an application is capable of detecting and authenticating the devices assigned to combined subscription. For example, closeness of the devices can be defined by an ad-hoc WLAN, a Bluetooth or some other short-range connection formed between the devices. However, in such an example, the operator needs to receive an information on the short-range connection in order to determine whether the device are close enough to each others.

It is also possible to use device's location information that is based e.g. on location information (such as GPS data) of the devices. In this example also, the location information needs to be conveyed from the device to the network where the analysis on the proximity can be made.

For combined subscription, the used charging model can be based either on flat-rate pricing or data block pricing. This means that all connections fulfilling the proximity requirements would be charged according to a fixed rate or according to a fixed monthly data block (e.g. 2 GB). However, any other connection would be charged differently, e.g. with an additional time based fee or the consumed data would be charged for example per kilobyte.

The combined subscription is based on user's profile at the operator's. When the contract between the user and the operator is made, the operator can define which user's devices are added to the combined subscription. Later on it is possible that the user himself updates the list of allowed devices for the combined subscription. The updating can be performed by contacting the customer service (by telephone, via web site or by SMS).

In addition to the constant combined subscription, in some cases the user may also apply temporal combined subscription. Such a situation may occur, when the user has two separate subscriptions e.g. official and personal. The official subscription is the combined subscription for work-related devices (having a smart phone as the main device). The personal subscription is intended for personal laptop. Now, as an example, the user wishes to use the official combined subscription for the personal laptop, because of an unexpected assignment. According to the present solution this is temporally possible when the devices are close enough to each others. However, from the operator's point of view, in addition to the proximity verification, the operator has to make another judgement on the person allowed to use the combined subscription.

It is appreciated that the combined subscription is mainly meant for different devices of a single user, but in some cases this requirement can be temporally overridden, if the user being mentioned in the combined subscription is using an external device (not being mentioned in the combined subscription). However, in the latter case, an additional check is made for the personality of the user.

It is appreciated that, by the present solution, multiple devices of a single user can use a single subscription in a controlled manner when connecting network, and that such a connection is charged differently. This differs from the solutions of related art, where multiple devices may share a subscription, but because of multiple users, these devices need additional identification for charging. In addition, the prior solution has disclosed a mobile telephone subscription for mobile telephones. It is realized, that if then the user had owned two or more mobile telephones, it would have been important to have an individual subscription for each to these because of different payer (e.g. personal subscription, business subscription). However, the need of having multiple devices by a single user that could use a single subscription has raised only now, when increasingly more of different types of devices can access a common data communications network.

The foregoing detailed description discloses the present invention by means of examples. The skilled person will appreciate that the detailed description has been given for better understanding of the invention, and some of the features (e.g. system configuration) may vary depending on the possible other functionalities that are incorporated with system.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A system for managing a subscription for a data communications network comprising:
   a main user communication device that is one of a smart phone, a tablet device, a personal computer, a laptop computer, and a palmtop computer, the main user communication device being identified in a subscription comprising a main user profile, the main user communication device having a data connection to the data communications network under the subscription, the subscription identifying a plurality of user communication devices of the main user and providing access to a data communication network, and the subscription defining a combined subscription charging model and an individual subscription charging model;
   at least one other user communication device identified in the subscription and being one of a smart phone, a tablet device, a personal computer, a laptop computer, and a palmtop computer of the same user;
   means for detecting a connection of the at least one other user communication device to the data communications network;
   means for determining a proximity of the main user communication device and the at least one other communication user device with respect to each other regardless of a location of the main user communication device, wherein the proximity is determined by an application residing in said main user communication device and said at least one other user communication device, the application being configured to detect and authenticate the main user communication device and said at least one other user communication device;

means for applying the combined subscription charging model for the data connection of the at least one other user communication device when the proximity is verified; and means for adding said at least one other user communication device to the main user profile.

2. The system according to claim 1, wherein the means for determining the proximity is configured to analyze whether the main user communication device and the at least one other communication user device are located in a same cell of the data communications network.

3. The system according to claim 1, wherein the means for determining the proximity is configured to analyze whether the main user communication device and the at least one other user communication device are located in neighbouring cells of the data communications network.

4. The system according to claim 1, wherein the means for determining the proximity is configured to receive location information of the main user communication device and the at least one other user communication device to verify the proximity.

5. The system according to claim 1, wherein the means for applying the combined subscription charging model are configured to apply the individual subscription charging model, if the proximity of the main user communication device and the at least one other user communication device is not verified.

6. The system according to claim 1, wherein the at least one other user communication device is of a different type than the main user communication device.

7. The system according to claim 1, wherein the data connection is a mobile data connection.

8. The system according to claim 1, wherein the combined subscription charging model is a flat-rate charging model.

9. The system according to claim 1, wherein the combined subscription charging model is based on data block pricing.

10. A method for managing a subscription for a data communications network comprising a main user communication device which is one of a smart phone, a table device, a personal computer, a laptop computer, and a palmtop computer, the main user communication device being identified in a subscription comprising a main user profile and the main user communication device having a data connection to the data communications network under the subscription, the subscription identifying a plurality of user communication devices of a same user and providing access to a data communications network, and the subscription defining a combined subscription charging model and an individual subscription charging model; and wherein at least one other user communication device is identified in the subscription and is one of a smart phone, a tablet device, a personal computer, a laptop computer, and a palmtop computer of the same user, the method comprising:

detecting a connection of the at least one other user communication device to the data communications network;

determining a proximity of the main user communication device and the at least one other user communication device with respect to each other regardless of the location of the main user communication device, wherein the proximity is determined by an application residing in said main user communication device and said at least one other user communication device, the application being configured to detect and authenticate the main user communication device and said at least one other user communication device;

applying the combined subscription charging model for the data connection of the at least one other user communication device, identified in the subscription, when the proximity is verified; and adding said at least one other user communication device to the main user profile.

11. The method according to claim 10, wherein the step of determining the proximity comprises analyzing whether the main user communication device and the at least one other user communication device are located in a same cell or in neighbouring cells of the data communications network.

12. The method according to claim 10, comprising:

applying an individual subscription charging model, if the proximity of the main user communication device and the at least one other user communication device is not verified.

* * * * *